United States Patent [19]
Toth

[11] 3,875,191

[45] Apr. 1, 1975

[54] PROCESS FOR THE PRODUCTION AND SEPARATION OF HYDROXYLAMINO ANTHRAQUINONE ISOMERS

[75] Inventor: Istvan Toth, Bottmingen, Basel-land, Switzerland

[73] Assignee: Sandoz Ltd., Basel, Switzerland

[22] Filed: June 14, 1972

[21] Appl. No.: 262,474

[30] Foreign Application Priority Data
June 17, 1971 Switzerland............................ 8817/71
June 25, 1971 Switzerland............................ 9344/71

[52] U.S. Cl. .............................................. 260/378
[51] Int. Cl............................................. C07c 97/12
[58] Field of Search .................................... 260/378

[56] References Cited
FOREIGN PATENTS OR APPLICATIONS
2,162,538  7/1972  Germany ............................ 260/369
2,228,660  12/1972  Germany ............................ 260/378

OTHER PUBLICATIONS
Haworth and Lapworth, Journal of the Chemical Society (London), Vol. 119, p. 774 & 775 (1921).
Barnett, Anthracene and Anthraquinone, (1921), pp. 193 and 194.
Beisler et al., Journal of the American Chemical Society, (1922), pp. 2,296–2,305.
Beilsteins Handbuck Der Organischen Chemie, Vierte Auflage, Vol. 15, Isocyclische Reike, (1932), p. 50.

*Primary Examiner*—Lorraine A. Weinberger
*Assistant Examiner*—Patrick J. Hagan
*Attorney, Agent, or Firm*—Gerald D. Sharkin; Richard E. Vila; Thomas C. Doyle

[57] ABSTRACT

Disclosed is a process for the production of $\alpha,\alpha'$-dihydroxylaminoanthraquinone or $\alpha$-monohydroxylaminoanthraquinone from a mixture comprising at least two components selected from $\alpha,\alpha'$-dinitroanthraquinone, $\alpha$-mononitroanthraquinone and anthraquinone, which process comprises subjecting the mixture to reduction conditions to reduce all the nitro groups of at least one nitro component, the resulting reaction mixture being treated with alkali-metal basic medium to separate the more soluble hydroxylamino compound from the other components of the reaction mixture. By the process the hydroxylamino compounds can be obtained in high purity and then be reduced to obtain the amino compounds in corresponding purity, the amino compounds being important intermediates in the dyestuffs industry.

12 Claims, No Drawings

PROCESS FOR THE PRODUCTION AND SEPARATION OF HYDROXYLAMINO ANTHRAQUINONE ISOMERS

Aminoanthraquinones, in particular 1-aminoanthraquinone, are important intermediates in the synthesis of anthraquinone dyes and for such use it is of importance to obtain them in high purity. The principal starting materials for the production of aminoanthraquinones are the corresponding nitroanthraquinones which are generally obtained by nitration of anthraquinone. Such nitration normally leads to a mixture of nitrated products which often contains unnitrated anthraquinone and, in order to obtain a particular aminoanthraquine, the corresponding nitroanthraquinone is separated from the nitrated mixture and then reduced or, alternatively, the nitration mixture as a whole is reduced and the desired aminoanthraquinone separated from the resulting aminoanthraquinone mixture. Separation at the nitro stage, e.g. by crystallisation or sublimation techniques, is regarded as being difficult and, when carried out using crystallisation techniques, losses of the desired product frequently occur. Separation at the amino stage, e.g. by sublimation or treatment with solvents, is simpler but again losses of the desired product frequently occur and expenditure on materials e.g. solvents,, can result in the process being uneconomical.

It has now been found that by subjecting a crude nitroanthraquinone mixture to partial reduction to the hydroxylamino stage, the hydroxylamine derivatives can be worked up with ease utilising their different solubilities in aqueous alkali media, whereby very pure 1-hydroxylamine anthraquinone and/or $\alpha,\alpha'$-dihydroxylaminoanthraquinone are obtainable and from which $\alpha$-aminoanthraquinone and/or $\alpha,\alpha'$-diaminoanthraquinone can be obtained in corresponding purity by further reduction.

Thus, according to the present invention, there is provided a process for the production of $\alpha$-monohydroxylaminoanthraquinone or $\alpha,\alpha'$-dihydroxylaminoanthraquinone from a mixture comprising at least two components selected from $\alpha$-mononitroanthraquinone, $\alpha,\alpha'$-dinitroanthraquinone and anthraquinone, which process comprises subjecting said mixture to partial reduction conditions such that all the nitro groups of at least one nitro component are reduced to the hydroxylamino stage, subjecting the resulting reaction mixture to treatment with an aqueous alkali-metal basic medium and separating the more soluble hydroxylamino compound from the less soluble component or components of the reaction mixture utilizing the relative solubilities of $\alpha,\alpha'$-dihydroxylaminoanthraquinone, $\alpha$-monohydroxylaminoanthraquinone, mononitroanthraquinone and anthraquinone in said medium.

In aqueous alkali-metal basic media, $\alpha,\alpha'$-dihydroxylaminoanthraquinone is more soluble than $\alpha$-monohydroxylaminoanthraquinone, which in turn is more soluble than anthraquinone and any residual non-reduced nitroanthraquinone.

As will be appreciated, in the aqueous alkali-metal basic medium, the hydroxylamino compounds will be in alkali-metal salt form. Conversion to the free acid form can be carried out, as desired, using conventional techniques.

The partial reduction is carried out in conventional manner, for example using sodium sulphide, potassium sulphide, aldehydes, such as formaldehyde and sugars, activated hydrogen or hydrogen in the presence of a catalyst, such as platinum. Electrochemical techniques can be used. The reduction may suitably be carried out at a temperature of from 0°C to the boiling point of the reaction medium, preferably from 0° to 60°C. The reaction is suitably carried out in an aqueous neutral to alkaline medium, preferably in a strongly alkaline medium.

The aqueous alkali-metal basic medium, in which separation is carried out, preferably has a pH value of above 9, more preferably of above 10. The medium may be provided, for example, by the use of alkali-metal hydroxides, e.g. lithium, sodium or potassium hydroxide, or by the use of alkali-metal sulphides, e.g. sodium or potassium sulphide.

It is preferred that the partial reduction is carried out in an aqueous, alkali-metal basic medium, whereby reduction and separation may be carried out in one and the same medium. This, for example, can be effected by using sodium sulphide or potassium sulphide both to effect reduction and to create the basic medium.

The process of the present invention is particularly suitable for the treatment of mixtures consisting essentially of $\alpha,\alpha'$-dinitroanthraquinone and $\alpha$-nitroanthraquinone, of mixtures consisting essentially of $\alpha$-nitroanthraquinone and anthraquinone and of mixtures consisting essentially of $\alpha,\alpha'$-dinitroanthraquinone, $\alpha$-nitroanthraquinone and anthraquinone. It is preferred, however, to apply the present invention to mixtures containing $\alpha$-nitroanthraquinone as main component with $\alpha,\alpha'$-nitroanthraquinone as minor component.

Where the starting mixture consists essentially of $\alpha$-nitroanthraquinone and anthraquinone, it is preferable to reduce all the $\alpha$-nitroanthraquinone to $\alpha$-hydroxylaminoanthraquinone, the $\alpha$-hydroxylamino compound going into solution in the alkali-metal basic solution as the alkali metal salt form, the anthraquinone remaining undissolved, and separation being effected, for example, by filtration. Even, however, if not all the $\alpha$-nitroanthraquinone is reduced, $\alpha$-hydroxylaminoanthraquinone, uncontaminated with the nitro compound, is obtainable since the nitro compound is insoluble in the basic solution.

If a crude nitroanthraquinone mixture consisting essentially of $\alpha$-nitroanthraquinone and $\alpha,\alpha'$-dinitroanthraquinone is used as starting materials, two operating methods can be employed.

In the first method, reduction is continued to the point at which all the $\alpha,\alpha'$-dinitroanthraquinone has been reduced to $\alpha\alpha'$-dihydroxylaminoanthraquinone while the $\alpha$-nitroanthraquinone is left unchanged. Upon treatment with the aqueous alkali-metal basic medium, the $\alpha,\alpha'$-dihydroxylaminoanthraquinone goes into solution whilst the $\alpha$-nitroanthraquinone remains undissolved. After separation of the two phases, a solution of $\alpha,\alpha'$-dihydroxylamino compound and a solid residue of $\alpha$-nitroanthraquinone are obtained. If desired, the $\alpha$-nitroanthraquinone can then be reduced either partially, to obtain $\alpha$-hydroxylaminoanthraquinone, or fully, in known manner, to obtain $\alpha$-aminoanthraquinone.

In the second method, reduction is continued to the point at which all the nitro groups in both nitro compounds have been reduced to hydroxylamino groups. The resulting product is treated with basic medium, the concentrations being controlled such that the less soluble α-hydroxylaminoanthraquinone is precipitated whilst the more soluble α,α'-dihydroxylaminoanthraquinone is dissolved, separation of the phases then being carried out.

If the starting mixture comprises un-reacted anthraquinone in addition to the α,α'-dinitro and α-mononitro compounds, the first method above can, if it is desired to obtain α-hydroxylaminoanthraquinone, be modified by subjecting the solid residue, which will contain α-nitroanthraquinone and anthraquinone, to partial reduction conditions to obtain a mixture of α-hydroxylaminoanthraquinone and anthraquinone. These can be separated by treatment with aqueous alkali-metal basic medium to obtain a liquid phase containing the α-hydroxylamino compound and a solid phase of the anthraquinone. Similarly, the second method above can be modified if anthraquinone is present. Thus, the precipitate will be a mixture of α-hydroxylaminoanthraquinone and anthraquinone from which the α-hydroxylamino compound can be separated by treating the mixture with aqueous alkali-metal basic medium to obtain a liquid phase containing the α-hydroxylamino compound and a solid phase of anthraquinone.

The separation step of the present invention, in combination with the reduction step if desired, may be carried out as a continuous or discontinuous process.

Having obtained the α-monohydroxylamino or α,α'-dihydroxylamino compounds in solution as the alkali metal salt form thereof, the corresponding free hydroxylamino compounds can be obtained by reducing the pH, e.g. to a value of less than 9, but preferably not less than 7.

Having obtained the α-hydroxylaminoanthraquinone and the α,α'-dihydroxylaminoanthraquinone, these can be reduced either in alkali-metal salt or free hydroxylamino form in known manner to obtain the corresponding aminoanthraquinones. With advantage, this reduction can be effected whilst the hydroxylaminoanthraquinones are still in the aqueous alkali metal basic medium and, where such a medium is used during the reduction of the nitro compounds to hydroxylamino compounds, it will be appreciated that the whole process can be carried out in the same medium.

Having obtained the α,α'-diaminoanthraquinone or α-monoaminoanthraquinone, conversion to corresponding anthraquinone dyes can be carried out in known manner.

The invention is illustrated by the following Examples in which the parts and percentages are by weight and the temperatures in degrees centigrade.

EXAMPLE 1

One hundred seventeen Parts of a crude nitration mixture composed of approximately 60% α-nitroanthraquinone and 40% unnitrated anthraquinone are suspended in 1,500 parts of water. One hundred fifty Parts of 17% sodium sulphide solution are added and the suspension is stirred for 20 minutes at 24°. It is then filtered with suction for 5 minutes, after which the filtercake is washed with 200 parts of a 17% sodium sulphide solution for 2 hours at 30°. The filtercake consists essentially of anthraquinone, while the sodium salt of the 1-hydroxylaminoanthraquinone is present in solution in the filtrate and the wash solution.

The mother lye and wash solution are combined, set with a further 250 parts of 17% sodium sulphide solution and held for 1 hour at 95°–98°. The precipitate formed (α-aminoanthraquinone) is filtered and washed clear with water. 63 Parts of α-aminoanthraquinone of 98% purity are obtained. The remaining anthraquinone contains about 3–5% 1-nitroanthraquinone as impurity and can be used again for nitration.

EXAMPLE 2

One hundred twenty-nine Parts of an anthraquinone-free nitration mixture consisting of 90% α-nitroanthraquinone and about 10% α,α'-dinitroanthraquinone are suspended in 700 parts of water. Two hundred Parts of 17% aqueous sodium sulphide solution are stirred into the suspension at room temperature. The suspension is filtered for 5 minutes and suction applied to the filtercake until it is thoroughly dry. The filtercake (α-nitroanthraquinone) is stirred into 1100 parts of water, to which a further 200 parts of 17% aqueous sodium sulphide solution are added. The mixture is held at 95°–98° for 1 hour, the product separated by filtration and washed for 2 minutes with water at 90°–95° until it is clear. 37 Parts of 97% α-aminoanthraquinone are obtained. A mixture of some α-hydroxylaminoanthraquinone and substantial amounts of α,α'-dihydroxylaminoanthraquinone remain in the mother lye, which can be reduced further to the corresponding aminoanthraquinones.

EXAMPLE 3

One thousand two hundred Parts of a nitroanthraquinone paste (480 parts dry content: 86.7% α-nitroanthraquinone and 8.7% α,α'-dinitroanthraquinone) are added to 1200 parts of water in a reaction vessel fitted with reflux condenser and stirrer, together with 600 parts of 40% sodium hydroxide solution and 1 part of dodecylbenzenesulphonic acid as wetting agent. The mixture is raised to 60° with stirring. At this temperature 150 parts of 35% formaldehyde are added dropwise in 1 hour. The reaction mixture is stirred further for 1 hour at 60°, after which the product is filtered off with suction for 3 minutes and washed for 15 minutes with about 10,000 parts of water until neutral. The filtrate and the wash solution contain the dihydroxylaminoanthraquinone compound, while the filtercake consists mainly of α-nitroanthraquinone.

The thus purified product is reduced to aminoanthraquinone by one of the conventional methods. The resulting α-aminoanthraquinone is of 96% purity.

EXAMPLE 4

13.7 Parts of crude nitroanthraquinone (91.3% 1-nitroanthraquinone, 4.22% 1,5-dinitroanthraquinone and 2.22% 1,8-dinitroanthraquinone) are stirred into 68.5 parts of water at 60°, followed by 47.7 parts of 30% sodium hydroxide solution and 0.01 part of dodecylbenzenesulphonic acid as wetting agent. Subsequently 2.85 parts of a 35% formaldehyde solution are dropped into the mixture in the course of 1 hour, then the mixture is stirred further for 2 hours at 60°. The product is filtered, the filtercake washed with water and reduced to 1-aminoanthraquinone. The yield is 9.1 parts of a 1-aminoanthraquinone of 95.9% purity.

EXAMPLE 5

A suspension of 126.5 parts of crude 1-nitroanthraquinone (92.6% 1-nitroanthraquinone, 0.3% 2-nitroanthraquinone, 6% α,α'-dinitroanthraquinone and 0.7% anthraquinone) in 800 parts of water and 13 parts of a 30% sodium hydroxide solution is stirred for 1 hour at 20°–22°. A solution of 11.3 parts of sodium sulphide in 100 parts of water is rapidly added at the same temperature. Stirring is continued for 40 minutes, after which time the product is filtered with suction, washed with 300 parts of a 1% aqueous sodium hydroxide solution and then with 300 parts of water. A filtercake A) and a filtrate B) are obtained, which are processed further as follows:

Filtercake A:

The filtercake is stirred into 1000 parts of water and set with 56 parts of sodium hydrosulphide in the form of an approximately 25% aqueous solution. The temperature is raised to 95° in 1 hour with stirring and the suspension stirred further for 1 hour at this temperature. The product is filtered off with suction, washed with 1000–2000 parts of hot water until it is neutral and colourless, and dried at 100°–120°. 100 Parts of a 1-aminoanthraquinone are obtained which is composed of 96.3% 1-aminoanthraquinone, 0.2% 2-aminoanthraquinone, 2.7% $\alpha,\alpha'$-diaminoanthraquinone and 0.8% anthraquinone.

Filtrate B: An approximately 25% aqueous solution of 8.1 parts of sodium hydrosulphite is added to the filtrate, which is then raised to 95°, held for 1 hour at this temperature and filtered with suction. The product is washed until neutral and colourless and is dried at 100°–120°.

What is claimed is:

1. A process for the production of monohydroxylaminoanthraquinone or dihydroxylaminoanthraquinone, which comprises reducing a mixture (a) comprising $\alpha$-mononitroanthraquinone and anthraquinone or a mixture (b) comprising $\alpha$-mononitroanthraquinone and 1,5- and/or 1,8-dinitroanthraquinone so that all nitro groups of the nitro compounds are reduced to the hydroxylamino stage, to produce a mixture ($a'$) comprising $\alpha$-monohydroxylaminoanthraquinone and anthraquinone or a mixture ($b'$) comprising $\alpha$-monohydroxylaminoanthraquinone and 1,5- and/or 1,8-dihydroxylaminoanthraquinone, partially dissolving the resulting reaction mixture in an aqueous alkali-metal basic medium to dissolve only the more soluble monohydroxylaminoanthraquinone component of mixture ($a'$) or only the more soluble dihydroxylaminoanthraquinone component of mixture ($b'$) and separating the dissolved hydroxylamino component from the undissolved components of the reaction mixture.

2. A process according to claim 1 wherein a mixture (a) is reduced to form a mixture ($a'$) and said mixture ($a'$) is partially dissolved in an aqueous alkali-metal basic medium to dissolve only the $\alpha$-monohydroxylaminoanthraquinone and the dissolved $\alpha$-monohydroxylaminoanthraquinone is separated from the undissolved anthraquinone.

3. A process according to claim 1 wherein a mixture (b) is reduced to form a mixture ($b'$) and said mixture ($b'$) is partially dissolved in an aqueous alkali-metal basic medium to dissolve only the 1,5- and/or 1,8-dihydroxylaminoanthraquinone and the dissolved dihydroxylaminoanthraquinone is separated from the undissolved $\alpha$-monohydroxylaminoanthraquinone.

4. A process according to claim 2, wherein the separated $\alpha$-monohydroxylaminoanthraquinone is reduced to $\alpha$-monoaminoanthraquinone.

5. A process according to claim 3, wherein the separated dihydroxylaminoanthraquinone is reduced to 1,5- and/or 1,8-diaminoanthraquinone.

6. A process according to claim 3, wherein the $\alpha$-monohydroxylaminoanthraquinone is reduced to $\alpha$-monoaminoanthraquinone.

7. A process according to claim 1, wherein the reduction of the starting mixture (a) or (b) is carried out at a temperature of from 0° to 60°C.

8. A process according to claim 7, wherein the reduction is carried out using sodium sulphide, potassium sulphide, formaldehyde, a sugar, activated hydrogen or hydrogen in the presence of a catalyst.

9. A process according to claim 8, wherein the reduction is carried out in an aqueous alkali-metal basic medium, said reduction step and the separation step being carried out in one and the same medium.

10. A process according to claim 1 wherein the aqueous alkali-metal basic medium has a pH value above 9.

11. A process according to claim 1, wherein the aqueous alkali-metal basic medium has pH value of greater than 10.

12. A process according to claim 11, wherein said basic medium is provided using an alkali-metal hydroxide or sulphide.

* * * * *